United States Patent [19]

Kunieda et al.

[11] Patent Number: 4,922,448
[45] Date of Patent: May 1, 1990

[54] WORD PROCESSING SYSTEM HAVING SMALL-SIZED AND LARGE-SIZED DISPLAYS FOR SIMULTANEOUS DISPLAY AND AUTOMATIC POWER SHUT-OFF CIRCUIT

[75] Inventors: Yoshio Kunieda; Toshishige Okamoto, both of Nagoya; Satoshi Furukawa, Suzuka, all of Japan

[73] Assignee: Brother Kogyo Kabushiki Kaisha, Aichi, Japan

[21] Appl. No.: 253,335

[22] Filed: Oct. 3, 1988

Related U.S. Application Data

[63] Continuation of Ser. No. 882,386, Jul. 7, 1986, abandoned.

[30] Foreign Application Priority Data

Jul. 10, 1985 [JP] Japan ................................. 60-152751
Jul. 11, 1985 [JP] Japan ................................. 60-152944
May 30, 1986 [JP] Japan ................................. 61-126949

[51] Int. Cl.$^5$ ............................................. G06F 3/14
[52] U.S. Cl. ................................. 364/900; 364/927.4; 364/927.5; 364/948.4; 364/943.43; 364/707; 364/521; 340/717; 400/83
[58] Field of Search ............... 364/200, 900, 518, 521, 364/710, 707, 188; 400/63, 76, 83; 340/716, 717

[56] References Cited

U.S. PATENT DOCUMENTS

| | | | |
|---|---|---|---|
| 4,016,365 | 4/1977 | Staar | 400/83 X |
| 4,110,794 | 8/1978 | Lester et al. | 340/717 X |
| 4,259,668 | 3/1981 | Nishimura et al. | 364/710 X |
| 4,419,661 | 12/1983 | Hefsngi | 340/707 |
| 4,434,419 | 2/1984 | Cooper et al. | 340/717 |
| 4,570,160 | 2/1986 | Imazeki et al. | 340/717 X |
| 4,620,808 | 11/1986 | Kurtin et al. | 400/83 |

FOREIGN PATENT DOCUMENTS 59-176834 10/1984 Japan ................................. 340/716
59-211868 11/1984 Japan .

OTHER PUBLICATIONS

"Radio.Shack 1985 Catalog", No. RSC-14, pp. 62-63.
Cronch et al., "Controlled Method of Power Partitioning", IBM TDB, vol. 24, No. 11A, Apr. 1982, pp. 5704-5705.
William T. Johnson, "Developing a Truly Portable Visicalc", Byte, Sept. 1983, pp. 66-76.

*Primary Examiner*—Thomas C. Lee
*Attorney, Agent, or Firm*—Oliff & Berridge

[57] ABSTRACT

A word processor including a main unit, a connector for connecting the main unit to a large-sized display, and a display controller for controlling the large-sized display. The main unit includes an input device for entering character data representative of characters, a memory for storing the character data, and a small-sized display capable of displaying up to a predetermined number of characters entered through the input device. The large-sized display has a larger display capacity than the small-sized display, and is controlled by the display controller so as to display the characters according to the character data stored in the memory.

6 Claims, 7 Drawing Sheets

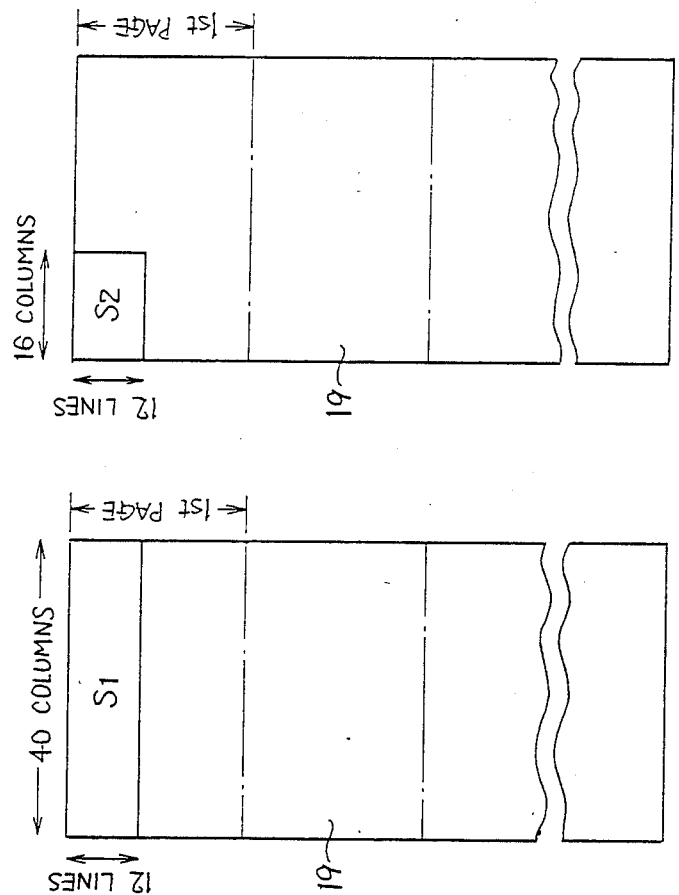
FIG. 11
FIG. 10
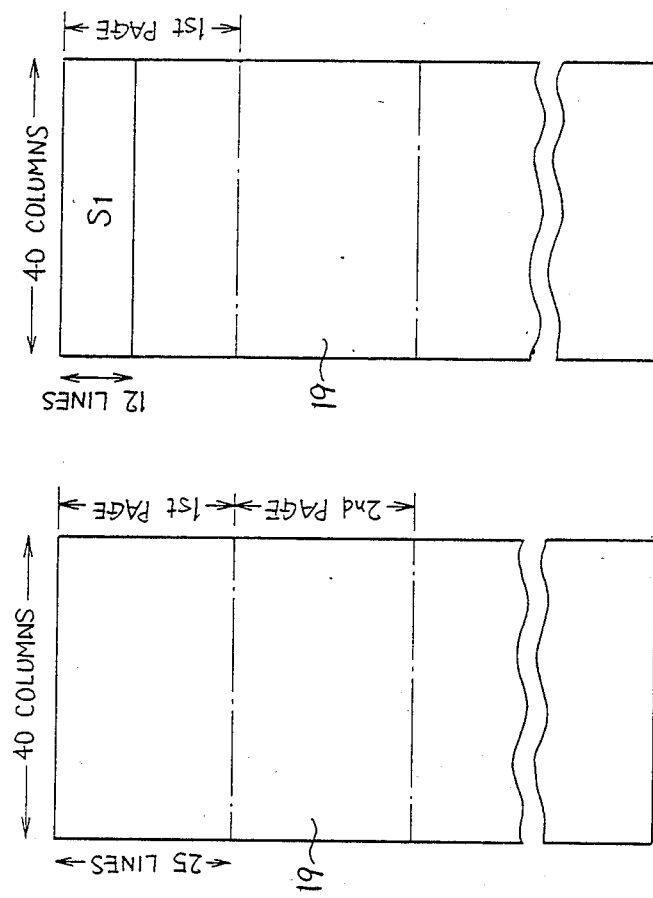
FIG. 3

WORD PROCESSING SYSTEM HAVING SMALL-SIZED AND LARGE-SIZED DISPLAYS FOR SIMULTANEOUS DISPLAY AND AUTOMATIC POWER SHUT-OFF CIRCUIT

This is a continuation of application Ser. No. 882,386 filed July 7, 1986, now abandoned.

BACKGROUND OF THE INVENTION

1. Field of Art

The present invention relates to a word processor system, and more particularly to its display device.

2. Description of Related Art

Display devices for word processors are roughly divided into two types, namely, a relatively large-sized display which is capable of displaying at one time a large number of characters corresponding to a page of a text, and a small-sized liquid crystal display which is capable of displaying only a limited number of characters.

A word processor equipped with a liquid crystal display having a relatively small digit capacity is generally small-sized, easy to carry, and inexpensive. Usually, such a liquid crystal display is disposed close to the keyboard of the processor so that the keyboard and the display lie in the same field of view of the operator. However, the maximum number of characters to be displayed on the display screen is limited. Therefore, the operator cannot see the overall arrangement or layout of the entered text or document, and experiences considerable difficulty in editing the text.

On the other hand, with a word processor having a large-sized display capable of simultaneous viewing of a whole page, it is easy to edit the text, since the page appears on the display screen as it is finally printed. However, such a word processor is impossible to carry, and expensive. A further inconvenience of this type of word processor derives from the arrangement of the large-sized display and the main unit with the keyboard as separate members, so that the display and the keyboard are not located within the same field of view of the operators. Consequently, those operators who are not skilled enough to key in a text without looking at the keyboard, must frequently nod, turning their eyes alternately between the keyboard and the display. This makes the operators tired.

As described above, each of the two types of word processor has an advantage and a disadvantage at the same time.

SUMMARY OF THE INVENTION

It is accordingly an object of the present invention to provide a word processor system which is easy to operate and improved from the standpoint of ergonomics, enjoying the advantages of the above-indicated two types of word processor equipped with a large-sized display and a small-sized display, respectively.

According to the present invention, there is provided a word processor system comprising a main unit, a large-sized display, and large-display control means. The main unit includes input means for entering character data representative of characters, memory means for storing the character data entered through the input means, and a small-sized display which has a first display capacity and is capable of displaying the characters which are entered through the input means. The large-sized display is disconnectable from the main unit, and has a second display capacity which is larger than the first display capacity of the small-sized display. The large-display control means is adapted to control the large-sized display to display thereon the characters based on the character data which is stored in the memory means.

According to another aspect of the invention, there is provided a word processor comprising a main unit, a connector for connecting the main unit to a large-sized display, and large-display control means. The main unit includes input means for entering character data representative of characters, memory means for storing the character data entered through the input means, and a small-sized display which has a first display capacity and is capable of displaying the characters entered through the input means. The large-sized display to which the main unit is connectable by the connector has a second display capacity which is larger than the first display capacity of the small-sized display provided on the main unit. The large-display control means is operable when the main unit is connected to the large-sized display, in order to control the large-sized display so as to display thereon the characters based on the character data stored in the memory means.

In the instant word processor system or word processor, the main unit which includes the small-sized display with a comparatively small display capacity is disconnectable from or connectable to the stand-alone large-sized display with a comparatively large display capacity, which is controlled by the large-display control means so as to display the characters according to the character data stored in the memory means incorporated in the main unit. Hence, the instant word processor system or word processor can enjoy the advantages of a conventional word processor equipped with a small-sized liquid crystal display, and of a conventional word processor equipped with a large-sized display. Described more specifically, with the main unit connected to the large-sized display, even the operators who are not sufficiently skilled in typing may key in a desired text while looking at the small-sized display provided on the main unit. Further, the operator may grasp the layout or arrangement of a comparatively large amount of the entered text, which is displayed on the large-sized display at one time, whereby the entered text may be easily edited. Moreover, the main unit having the small-sized display can be operated without the large-sized display. The main unit alone can be easily carried to a desired location for data entry through its keyboard while viewing the small-sized display. The entered data can be easily edited if connected to the large-sized display.

In the word processor system of the invention, the large-display control means is preferably incorporated in the large-sized display.

According to one feature, of the invention, the large-sized display is adapted to provide an indicator which indicates the characters currently displayed on the small-sized display.

In one form of the above feature of the invention, the word processor system comprises first display control means, second display control means, search means and indication control means. The first display control means is adapted to retrieve from the memory means a group of character data representative of a group of successive characters corresponding to the first display capacity of the small-sized display, so that the group of successive characters is displayed on the small-sized display, based on the retrieved group of character data. The second display control means, on the other hand, retrieves from the memory means a batch of character data representative of a batch of characters which corresponds to the second display capacity of the large-sized display and which includes the group of successive characters. The batch of characters represented by the retrieved batch of character data is displayed on the large-sized display. Thus, the second display control means constitutes the large-display control means indicated above. The search means functions to search for the group of character data representative of the group of successive characters which are currently displayed on the small-sized display. The indication control means is adapted to display an indicator for distinguishing the group of successive characters of the batch of characters displayed on the large-sized display, from the other characters displayed on the large-sized display. The indication control means may include first cursor control means for controlling a position of a first cursor on the small-sized display, and second cursor control means for controlling a position of a second cursor on the large-sized display, such that the positions of the first and second cursors correspond to each other, so as to indicate the same character.

According to another feature of the present invention, the word processor further comprises detector means for sensing whether the large-sized display and the main unit are connected to each other or not, and power shut-off means which is responsive to the detector means for disconnecting a power supply to the display control means when the detector means senses that the large-sized display and the main unit are not connected to each other. In this case, when the main unit is used without being connected to the large-sized display, the power supply to the display control means is automatically shut off by the power shut-off means, whereby an otherwise possible waste of energy is avoided. This advantage is significant since the main unit having the small-sized display may be used at a place (for example, at the office of a customer of the user) remote from the large-sized display which is usually installed at a fixed place, for example, at the user's home or office. The large-sized display may be a cathode ray tube used as a part of a TV set, or for other purposes.

In one form of the above feature of the invention, the detector means comprises a switch disposed adjacent to a connector for connecting the large-sized display and the main unit to each other, such that the switch is closed when the large-sized display and the main unit are connected by the connector, and opened when the large-sized display and the main unit are disconnected from each other. The switch is connected in a power supply line for supplying power to the display control means. Therefore, the switch also serves as the power shut-off means, to disconnect the power supply line when the large-sized display and the main unit are disconnected from each other.

According to one feature of the word processor of the invention, the main unit incorporates the large-display control means. In one preferred form of this feature of the invention, the word processor system further comprises a DC power source, an AC adapter for converting an AC power supply into a DC power supply, and a selector switch for connecting selectively the DC power source or the AC adapter at least to the large-display control means. According to a preferred arrangement of this form of the invention, at least one of the large-sized display and the small-sized display is adapted to provide a message prompting the operator of the word processor system to operate the selector switch so as to connect the AC adapter to the large-display control means, when the detector means senses that the large-sized display and the main unit are connected to each other.

BRIEF DESCRIPTION OF THE DRAWINGS

The foregoing and other objects, features and advantages of the present invention will be better understood by reading the following detailed description of preferred embodiments of the invention, when considered in connection with the accomapnying drawings, in which:

FIG. 3 is a view illustrating pagination of a text in a text memory of the word processor system;

FIGS. 10 and 11 are views showing a portion of a text in the text memory, which is displayed on modified forms of the large-sized display;

DETAILED DESCRIPTION OF THE PREFERRED EMBODIMENTS

Figure 1:
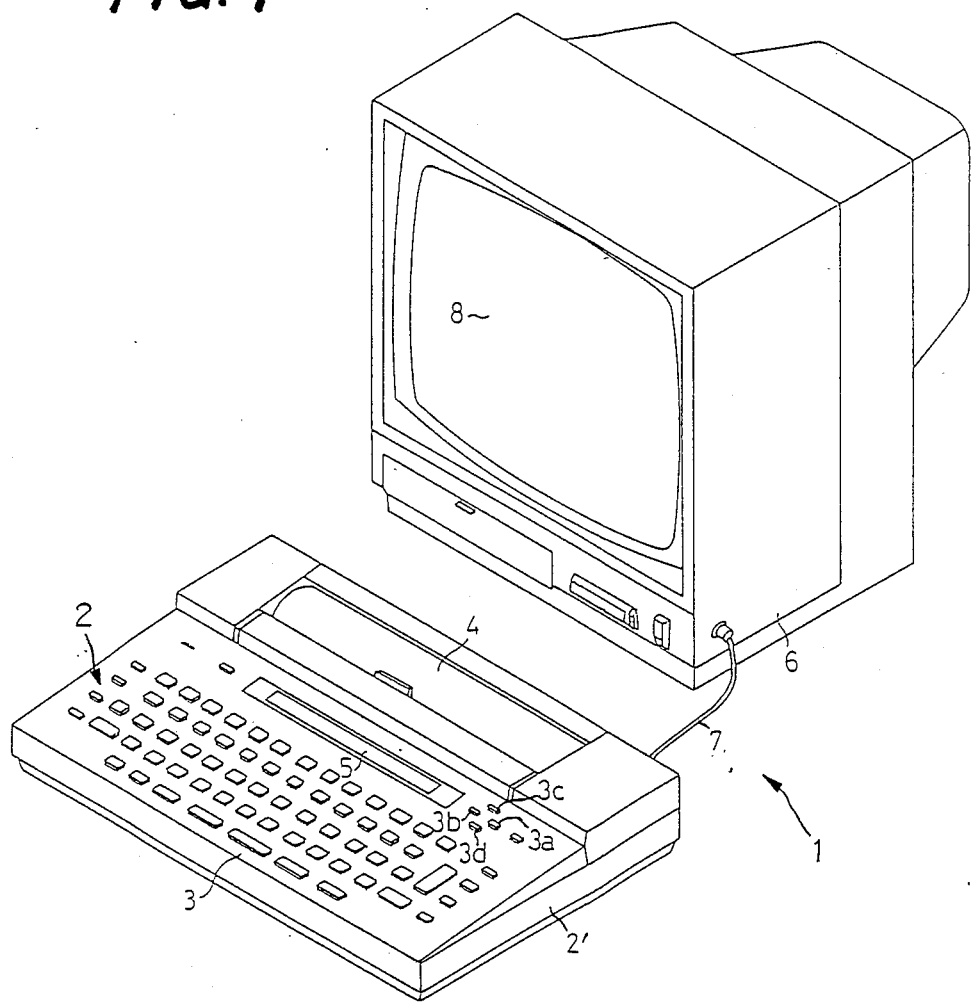
FIG. 1 is a perspective view of one embodiment of a Japanese word processor system of the invention.

Referring first to FIG. 1, there is shown a Japanese word processor system generally indicated at 1. The word processor system 1 comprises a main unit 2, and a large-sized display 6 which is connectable to the main unit 2. The main unit 2 has a keyboard 3 provided as data input means on a front part of a housing 2', a printer 4 in a rear part of the housing 2', and a small-sized liquid crystal display 5 disposed between the keyboard 3 and the printer 4. The keyboard 3 has a multiplicity of character keys corresponding to alphabetic letters, numerals and symbols, and a plurality of function keys such as a space key, a carriage return key, paging keys, a "hiragana"/"kanji" conversion key, and other keys as provided on an ordinary word processor. The keyboard 3 further has four cursor keys 3a, 3b, 3c and 3d for moving display cursors 5a and 6a which will be hereinafter described. The liquid crystal display 5 has a 15-digit display capacity, that is, the display 5 is capable of displaying up to 15 characters entered through the keyboard 3.

The large-sized display 6, which is a stand-alone unit, is connectable to the main unit 2 by a cable 7. This display 6 has a display screen 8 whose resolution is defined by 400 dots along the height (in the vertical direction), and 640 dots along the width (in the horizontal direction). The display screen 8 is capable of displaying a maximum of 1000 characters in 25 lines each consisting of 40 columns. The display screen 8 is controlled by a control section 9 incorporated in the housing of the display 6.

Figure 2:
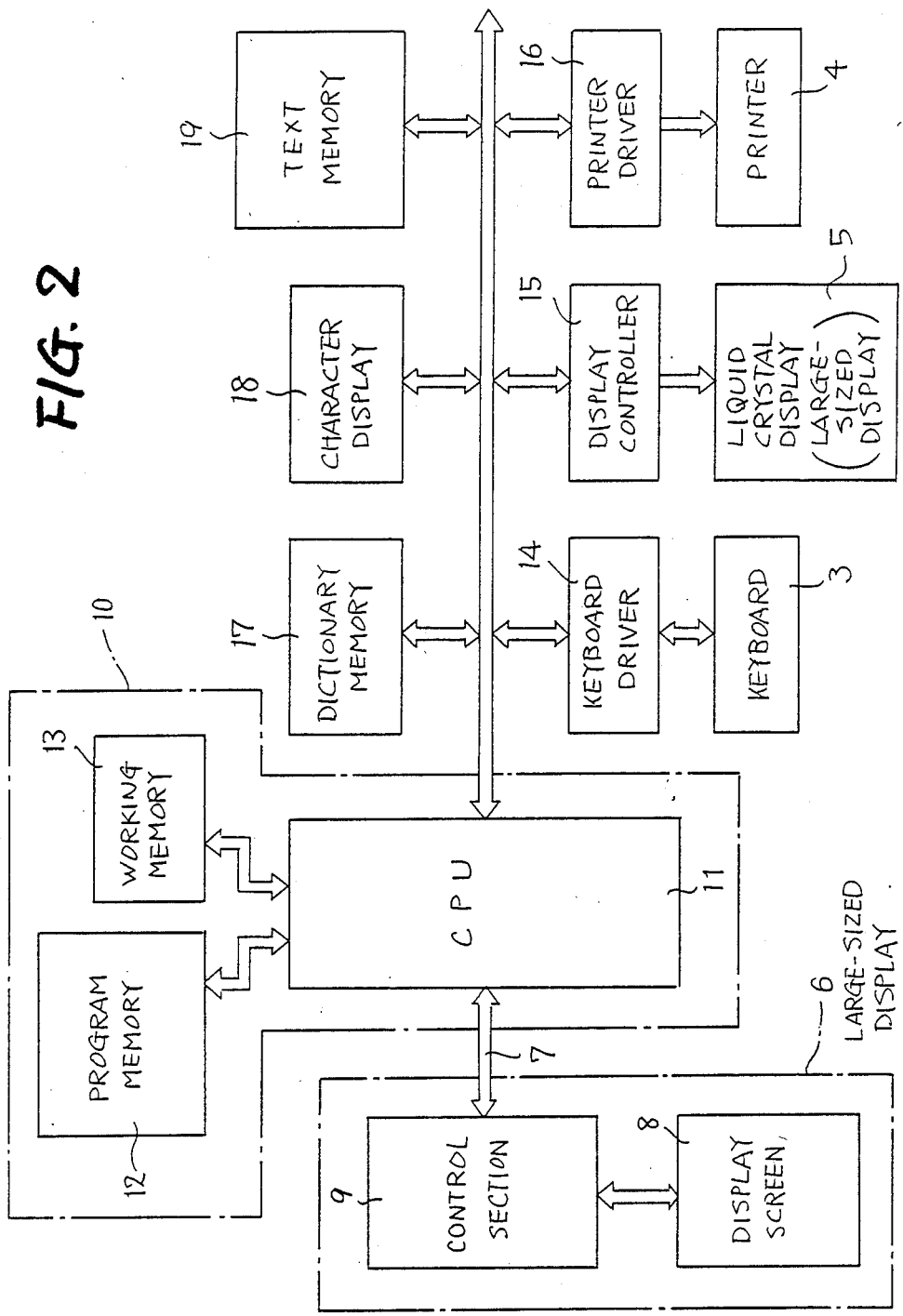
FIG. 2 is a schematic block diagram showing a control arrangement of the word processor system.

Referring next to a block schematic diagram of FIG. 2, a control arrangement of the present word processor system will be described.

The housing 2' of the main unit 2 incorporates a microcomputer 10 which includes a central processing unit (hereinafter referred to as "CPU") 11, a program memory 12 constituted by a read-only memory (ROM), and a working memory 13 constituted by a random-access memory (RAM). The CPU 11 is connected to the keyboard 3 through a keyboard driver 14, to the liquid crystal display 5 through a display controller 15, and to the printer 4 through a printer driver 16. The CPU 11 is further connected to a dictionary memory 17, a character generator 18, a text memory 19, and other memories. The text memory 19 serves as memory means for storing character data representative of characters entered through the keyboard 3. The CPU 11 is also connected to the large-sized display 6 through the cable 7 indicated above.

The program memory 12 stores various control programs such as a main control program for controlling the main unit 2, a keyboard control program for controlling the keyboard 3, a printer control program for controlling the printer 4, a small-display control program for controlling the liquid crystal display 5 via the display controller 15, a large-display control program for controlling the large-sized display 6 via its control section 9, and cursor/indicator control programs for controlling the cursors 5a, 6a, and an indicator 6b on the display 6. The CPU 11 operates according to these control programs.

The dictionary memory 17 stores "kanji" data representative of a multiplicity of Chinese characters (used in Japanese writing). The character generator stores character pattern data representative of dot-matrix patterns of the individual letters, numerals and symbols. The text memory 19 stores text data representative of a text or document entered through the keyboard 3. The text data includes character data entered through the character keys and the space key, and carriage return data entered through the carriage return key.

The operation of the Japanese word processor system 1 constructed as described above will now be described.

With the large-sized display 6 connected to the main unit 2 by the cable 7, the keyboard 3 is first operated to establish a desired printing format on a sheet of paper, more specifically, so as to print 25 lines with 40 columns per line. In response to this operation of the keyboard 3, the CPU 11 operates according to the previously indicated main control program in the program memory 12, in order to paginate the text memory 19 as indicated in FIG. 3. Namely, the text memory 19 is set so that each page consists of 25 lines each of which consists of 40 characters. At the same time, the large-sized display 6 is set so that the display format of the display screen 8 is identical with the printing format of 25 lines×40 columns.

Then, the operator keys in a desired text through the appropriate character keys, and the space key, carriage return key and other function keys as needed. In response to the signals from the keyboard 3, the CPU 11 operates according to the keyboard control program in the program memory 12 to convert the signals of the operated keys into the corresponding character data (including space data), carriage return data and other data, which are successively stored as text data into the text memory 19. The character data represent Japanese "hiragana" letters, Japanese "katakana" letters, Chinese characters, and other characters such as numerals and symbols.

Figure 4:
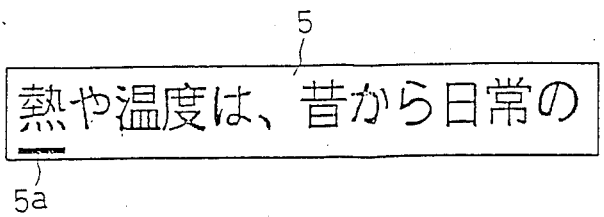
FIG. 4 is an illustrative view of a liquid crystal display, indicating a display on the display screen.

As the text is entered through the keyboard 3 and the corresponding text data is stored in the text memory 19, the CPU 11 operates according to the small-display control program in the program memory 12, in order to retrieve from the text memory 19 the character data for the first twelve characters (including a space) of a first page of the text. Based on the character data retrieved one after another from the text memory 19, the CPU 11 commands the display controller 15 to display the first twelve characters on the liquid crystal display 5, as indicated in FIG. 4, starting at the leftmost position. After the liquid crystal display 5 is filled with the twelve characters, the currently displayed characters are shifted one position to the left each time a new character is entered. Namely, the leftmost character disappears from the display 5, and the newly entered character is displayed at the rightmost position.

Chinese characters ("kanji" or ideograms) are entered through the appropriate "hiragana" keys corresponding to the Japanese "hiragana" letters (Japanese phonetic symbols). When the "hiragana" keys are operated to enter a Chinese character, the corresponding "hiragana" letters are displayed on the liquid crystal display 5. Subsequently, the operator operates the "hiragana"/"kanji" conversion key, and the "hiragana" letters which have been displayed are replaced by a plurality of candidate Chinese characters or "kanji" characters (a maximum of 12 characters) which have the same phonetic spelling. One of the displayed candidate characters is selected by the appropriate number entered through the numeral keys. Then, the liquid crystal display 5 displays the previously displayed characters plus the selected Chinese character, in place of the candidate Chinese characters. If the twelve candidate Chinese characters displayed on the display 5 do not contain a desired Chinese character, the operator operates the "hiragana"/"kanji" conversion key again, to display the next group of candidate Chinese characters. The operator selects the desired Chinese character from among the newly displayed group of candidates, in the same manner as described above. If this group of candidates does include the desired Chinese character, the above steps are repeated.

Figure 5:
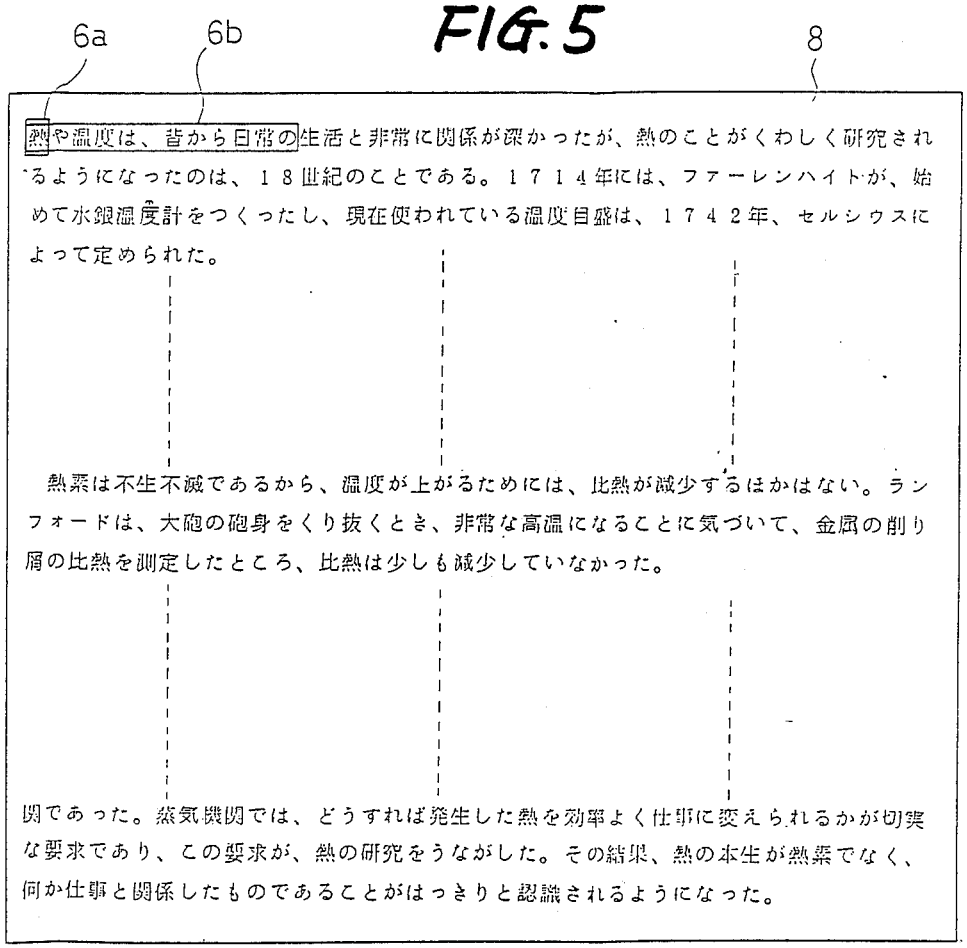
FIG. 5 is an illustrative view of a large-sized display, indicating a display on the display screen.

In the meantime, the CPU 11 operates to retrieve from the text memory 19 the text data representing the first page of the text, and transfer the retrieved data to the control section 9 of the large-sized display 6, for displaying the first page of the text on the display screen 8, as indicated in FIG. 5, according to the large-display control program in the program memory 12.

Further, the CPU 11 operates according to the cursor/indicator control programs in the program memory 12, to position the cursor 5a of the liquid crystal display 5 at its leftmost position or column (more precisely, right below the character at the leftmost position), as indicated in FIG. 4. At the same time, the CPU 11 operates to position the cursor 6a of the large-sized display 5 at the position of the screen 8 corresponding to the position of the cursor 5a. Described in more detail, the CPU 11 searches for the position of the cursor 5a of the liquid crystal display 5, and searches for the position on the screen 8 of the large-sized display 6, at which the character designated by the cursor 5a on the display 5 is displayed. Then, the CPU 11 operates to position the cursor 6a at the searched position to indicate the same character. At this point of time, therefore, the cursor 6a is located at the first column of the first line on the screen 8 of the large-sized display 6.

Meanwhile, the CPU 11 searches for the character data in the text memory 19, which represents the first character of the group of twelve characters currently displayed on the liquid crystal display 5. Subsequently, the CPU 11 retrieves from the text memory 19 the group of character data representative of the twelve characters displayed on the display 5. Based on the retrieved group of character data, the CPU 11 searches for the twelve characters displayed on the screen 8, and commands the control section 9 of the display 6 so that the screen 8 provides an indicator in the form of a rectangular indicator block 6b surrounding the searched group of twelve characters, as shown in FIG. 5, in order to distinguish these characters from the other characters displayed on the screen 8.

When any one of the four cursor keys 3a–3d (CURSOR-RIGHT key 3a, CURSOR-LEFT key 3b, CURSOR-UP key 3c and CURSOR-DOWN key 3d) is operated, the CPU 11 operates, based on the signal generated by the operated cursor key, to move the cursors 5a and 6a in the corresponding one of the four directions: right direction; left direction; upward direction; and downward direction.

When the CURSOR-RIGHT key 3a is operated, the cursors 5a, 6a are moved one position or column to the right per each operation of the key. The CPU 11 determines the new position of the cursor 5a, 6a, based on the current position of the cursor and the number of operations of the cursor key 3a.

If the CURSOR-RIGHT key 3a is operated when the cursor 5a is located at the rightmost column of the liquid crystal display 5, the cursor 6a of the large-sized display 6 is moved one column to the right, but the cursor 5a on the display 5 remains at the rightmost column while the twelve characters which have been displayed are shifted one column to the left, and the next character to the right of the previous rightmost character is newly displayed at the rightmost column. Thus, the new character is displayed at the position of the cursor 5a, and the leftmost character of the previously displayed twelve characters disappears from the display 5.

When the group of twelve characters displayed on the small-sized liquid crystal display 5 is thus changed, the CPU 11 searches for the character data in the text memory 19, which represents the first character displayed on the display 5. Based on the searched character data, the CPU 11 retrieves the group of character data corresponding to the group of twelve characters displayed on the display 5. Then, the CPU 11 commands the control section 9 of the large-sized display 6 so that the rectangular indicator block 6b surrounds the group of twelve characters represented by the retrieved group of character data. If the CURSOR-RIGHT key 3a is operated once, the indicator block 6b on the display screen 8 is moved one column to the right.

Similarly, the cursors 5a and 6b are moved one column to the left upon each operation of the CURSOR-LEFT key 3b. If the CURSOR-LEFT key 3b is operated while the cursor 5a is at the leftmost position of the display 5, the cursor 6a of the large-sized display 6 is moved one column to the left, but the cursor 5a on the display 5 remains at the leftmost column while the twelve characters which have been displayed are shifted one column to the right, and the character to the left of the previous leftmost character is again displayed at the leftmost column. The rightmost character of the previously displayed twelve characters disappears from the display 5.

When the group of twelve characters displayed on the small-sized liquid crystal display 5 is thus changed, the CPU 11 searches for the character data in the text memory 19, which represents the first or leftmost character displayed on the display 5. Based on the searched character data, the CPU 11 retrieves the group of character data corresponding to the group of twelve characters displayed on the display 5. Then, the CPU 11 commands the large-sized display 6 so that the rectangular indicator block 6b surrounds the group of twelve characters represented by the retrieved group of character data. Thus, the indicator block 6b on the display screen 8 is moved one column to the left.

Figure 6:
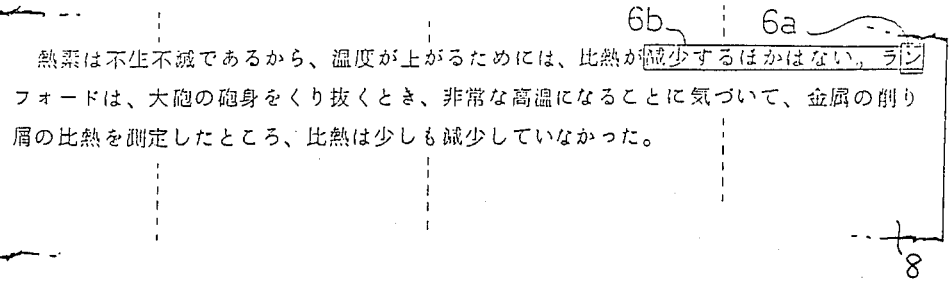
FIGS. 6 through 9 are illustrative views showing movements of an indicator on the screen of the large-sized display.

If the CURSOR-RIGHT key 3a is operated while the cursor 6a on the display screen 8 of the display 6 is at the rightmost column of a line and while the rectangular indicator block 6b is at the right end of the line, as shown in FIG. 6, the CPU 11 judges that the cursor 6a is at the rightmost column of the line, and suppresses the signal generated by the CURSOR-RIGHT key 3a, holding the cursor 6a and the indicator block 6b at the same positions. At the same time, the CPU 11 inhibits the liquid crystal display 6 from moving its cursor 5a and the currently displayed characters.

Similarly, the CPU 11 inhibits the displays 5 and 6 from moving their cursors 5a, 6a, and the indicator block 6b from moving to the left, if the CURSOR-LEFT key 3b is operated while the cursor 6a is at the leftmost column of a line and while the indicator block 6b is at the left end of the line.

There will be described the operations when the CURSOR-UP key 3c and the CURSOR-DOWN key 3d are operated.

Figure 7:
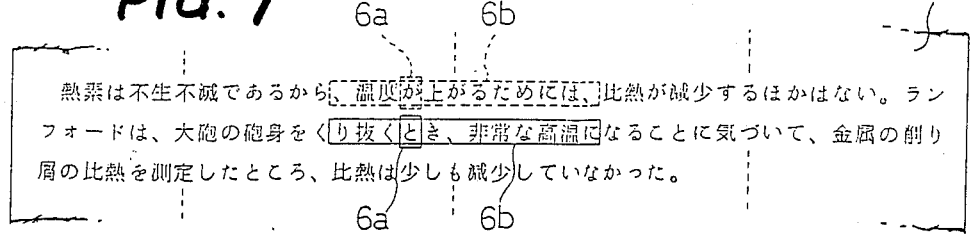

If the CURSOR-UP key 3c is operated while the cursor 6a and the indicator block 6b are located at the positions indicated in solid lines in FIG. 7, the CPU 11 commands the large-sized display 6 so that the cursor 6a and the indicator block 6b are moved upward by one line, as shown in dashed line in FIG. 7. Namely, the cursor 6a and indicator block 6b are moved from their positions in the current line to the corresponding positions in the preceding line. Simultaneously, the CPU 11 searches for the character data corresponding to the new position of the cursor 6a, and the group of character data corresponding to the new position of the indicator block 6b. The CPU 11 retrieves the searched character data and the searched group of character data from the text memory 19. The CPU 11 then commands the display controller 15 to clear the display 5, and display thereon the group of characters represented by the retrieved group of character data, and position the cursor 5a at the position of the character represented by the retrieved character data corresponding to the position of the newly positioned cursor 6a.

If the CURSOR-DOWN key 3c is operated, the CPU 11 commands the large-sized display 6 to move downward the cursor 6a and the indicator block 6b by one line, that is to the next line. After the display 5 is cleared, the CPU 11 commands the display controller 15 to display on the display 5 the group of characters indicated by the newly positioned indicator block 6b, and position the cursor 5a at the position of the character indicated by the newly positioned cursor 6a.

Figure 8:
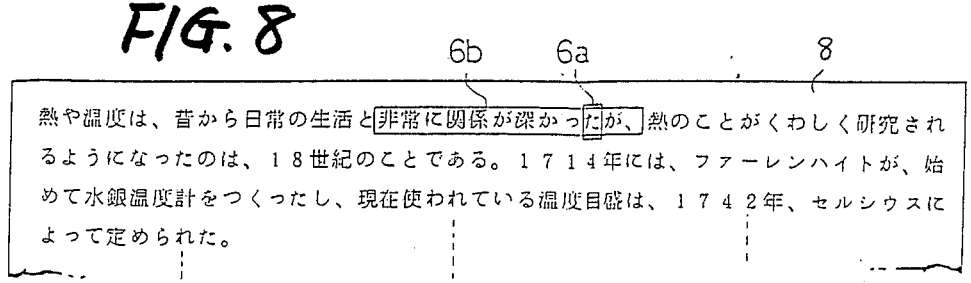
Figure 9:
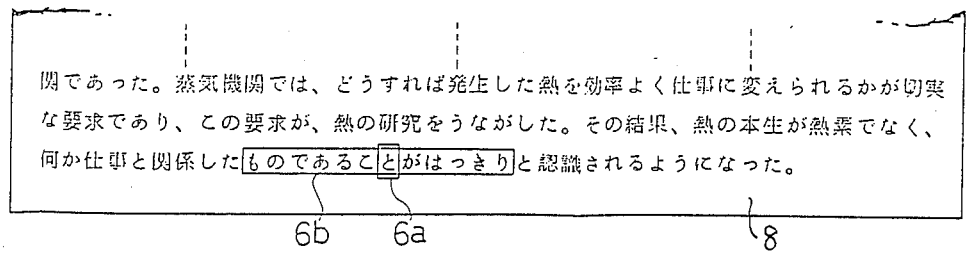

In the case where the CURSOR-UP key 3c is operated while the cursor 6a is positioned in the first line of the screen 8 as indicated in FIG. 8, the CPU 11 judges that the cursor 6a is at the first line, and suppresses the signal generated by the CURSOR-UP key 3c, whereby the cursor 6a and the indicator block 6b remain at the same positions.

Further, the CPU 11 checks if the first line of characters displayed on the screen 8 corresponds to the group of character data of the first page of the text memory 19. If so, the CPU 11 does not command the control section of the display 6 to effect a downward scrolling of the screen 8 for displaying the preceding line, since there exists no preceding line. In this case, the CPU 11 controls the display controller 15 so that display 5 maintains the current display of the characters, and the current position of the cursor 5a.

If the second or subsequent page of the text in the text memory 19 is currently displayed on the screen 8, the operation of the CURSOR-UP key 3c with the cursor 6a positioned in the first line of the display on the screen 8 will cause the CPU 11 to command the control section 9 of the large-sized display 6, so as to effect a downward scrolling of the screen 8, for displaying as the first line the last line (25th line) of the preceding page of the text data stored in the text memory 19.

With the above scrolling operation, the cursor 6a and the indicator block 6b indicate the corresponding character and group of characters of the newly displayed first line of the page on the screen 8. Simultaneously, the liquid crystal display 5 displays the same group of characters as indicated by the indicator block 6b, and the cursor 5a is located at the position of the character indicated by the cursor 6a.

Similarly, if the CURSOR-DOWN key 3d is operated while the cursor 6a is positioned in the last or 25th line of the screen 8, the CPU 11 suppresses the signal generated by the CURSOR-DOWN key 3c, to maintain the current positions of the cursor 6a and the indicator block 6b.

Further, the CPU 11 checks if the text memory 19 stores the page next to the page displayed on the screen 8. If so, the operation of the CURSOR-DOWN key 3c in the above-indicated condition will cause the CPU 11 to command the control section 9 of the large-sized display 6, so as to effect an upward scrolling of the screen 8, for displaying as the 25th line the first line of the next page of the text data stored in the text memory 19. With the above scrolling operation, the cursor 6a and the indicator block 6b indicate the corresponding character and group of characters of the newly displayed 25th line of the page on the screen 8. Simultaneously, the liquid crystal display 5 displays the same group of characters as indicated by the indicator block 6b, and the cursor 5a is located at the position of the character indicated by the cursor 6a.

As described above, the present word processor system 1 is adapted such that a group of twelve successive characters displayed on the liquid crystal display 5 is the same as a group of twelve characters surrounded by the indicator block 6b the screen 8 of the large-sized display 6. In addition, the cursor 5a on the liquid crystal display 5 and the cursor 6a on the display screen 8 indicate the same character at the same position of a text. In this arrangement, the liquid crystal display 5 disposed close to the keyboard 3 permits even an unskilled typist to easily key in a text while viewing the display 5, without alternately watching the keyboard 3 and the large-sized display 6. Further, the large-sized display 6 whose screen 8 is capable of displaying a whole page of an entered text, facilitate an editing of the entered text, particularly for a skilled operator who can manipulate the keyboard without watching the keys. Thus, the present word processor system assures increased ease of operation and improved editing efficiency.

While the large-sized display 6 has 400 dots along the vertical, and 640 dots along the horizontal, the display 6 may be replaced by a display for an AV television receiver having 192 vertical dots and 640 horizontal dots, or by a display for a home television receiver having 192 vertical dots and 256 horizontal dots. Since the main unit 2 of the word processor system 1 is designed such that each character requires a matrix of 16×16 dots, the AV television display is capable of displaying a maximum of only 12 lines each of which consists of 40 characters, while the home television display is capable of displaying a maximum of 12 lines each consisting of only 16 characters.

In the case where the main unit 2 is used with the larage-sized display 6 whose screen 8 displays 25 lines×40 characters, a whole page of a text in the text memory 19 is displayed as shown in FIG. 3. However, when the AV television or home television display is used, the CPU 11 retrieves from the text memory 19 only a portion of a page of the text which can be displayed, that is, which corresponds to a page (12 lines×40 characters or 16 charcters) to be displayed on the display, as indicated at S1 and S2 in FIGS. 10 and 11. However, any portion of the page can be displayed by operating the cursor keys 3a–3d on the keyboard 3. With the cursor 5a, 6a moved by the cursor keys 3a–3d, the portion of the page to be retrieved by the CPU 11 is shifted.

Although the large-sized display 6 is adapted to display characters entered through the keyboard 3, it is possible that a large-sized display may display suitable marks such as circles or triangles in place of the actually entered characters, especially where the capacity of the large-sized display is relatively limited, like an AV television or home television display. Since such marks may be represented by a matrix of a smaller number of dots, as compared with a 16×16 dot matrix required for representing a character, an AV television or home television display may display a whole page (25 lines×40 characters) in the form of lines of the same marks. In this instance, the indicator block 6b indicates a group of the successive marks which corresponds to a group of actually entered charcters displayed on the small-sized display 5. Further, the cursor 6a indicates the mark corresponding to the character indicated by the cursor 5a on the display 5.

While the rectangular indicator block 6b is used as an indicator to indicate a group of characters displayed on the small-sized display 5, it is possible to use other types of indicators, for example, by displaying the characters in a negative form (with the lights and shapes reversed), by underscoring the characters, or by changing the color of the characters from that of the other characters (if the large-sized display is a color display).

Figure 12:
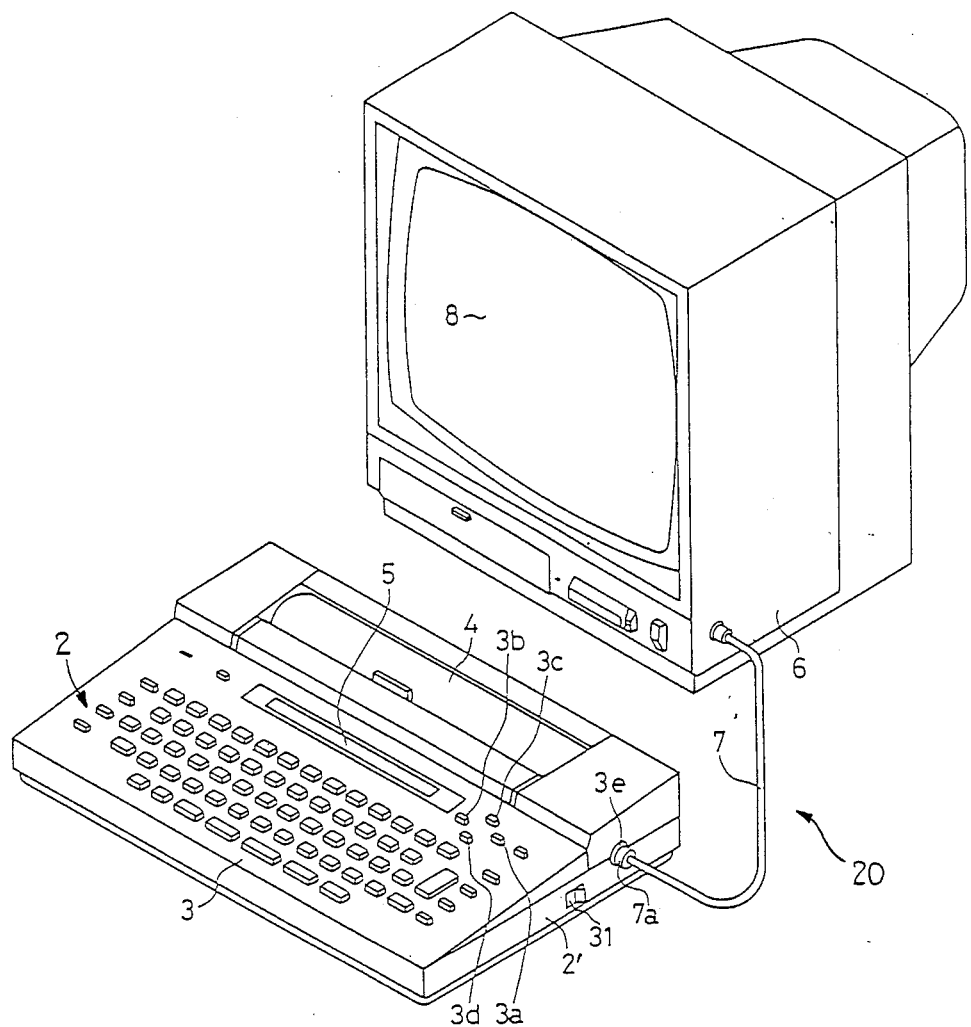
FIG. 12 is a perspective view of another embodiment of a Japanese word processor system.
Figure 13:
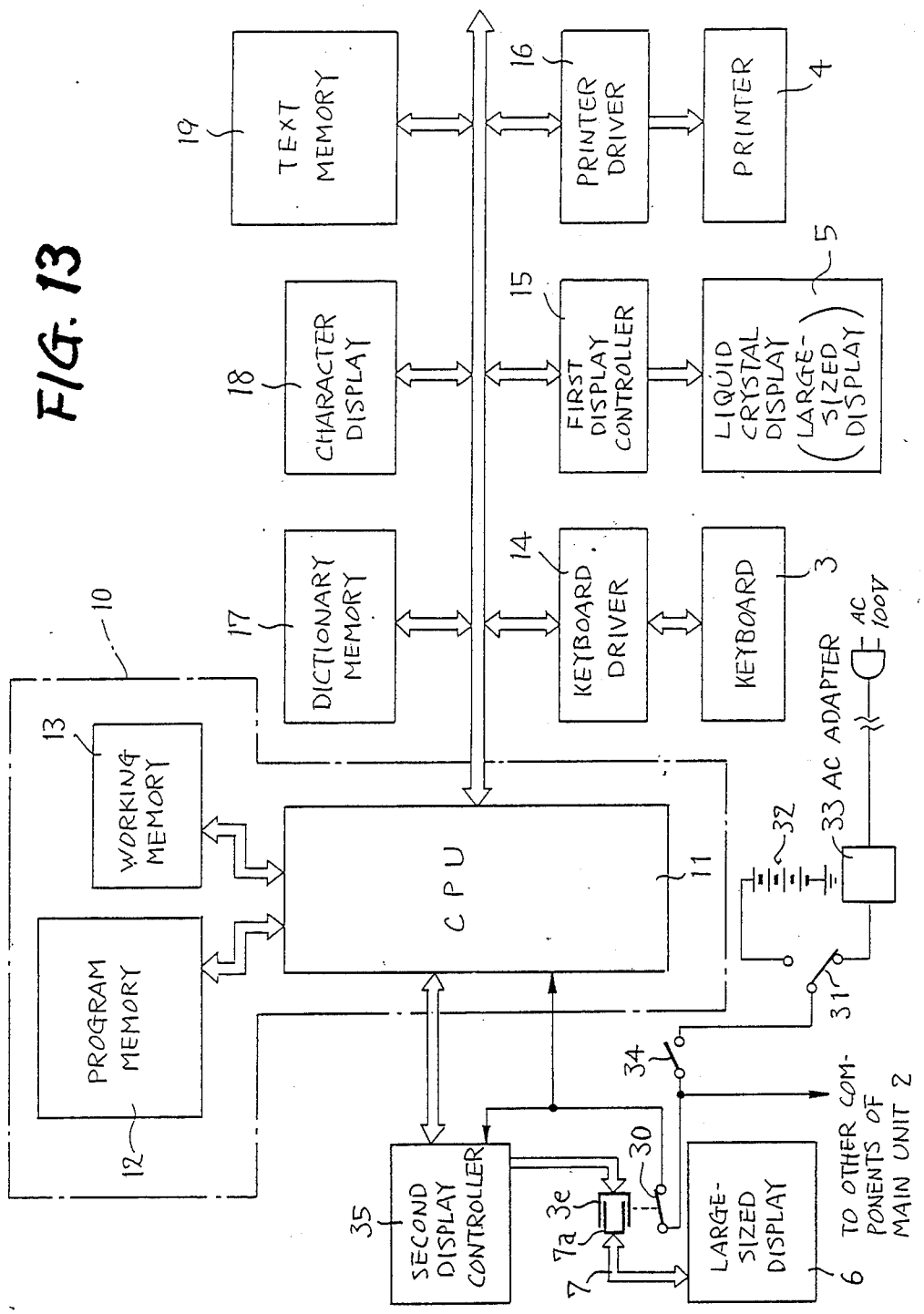
FIG. 13 is a schematic block diagram showing a control arrangement of the modified word processor system of FIG. 12.

Referring next to FIGS. 12 and 13, there is shown a modified embodiment of the word processor system indicated generally at 20 in FIG. 12. A major difference of this embodiment from the preceding embodiment is that the main unit 2 incorporates a second display controller 35 which performs the same function as the control section 9 incorporated in the large-sized display 6 of the preceding embodiment. Because of this difference, the present modified word processor system 20 is also different in some other aspects as described below. In FIGS. 12 and 13, the same reference numerals as used in the preceding figures will be used to identify the corresponding parts. In the present embodiment, the display controller 15 for the small-sized liquid crystal display 5 is referred to as "first display controller". Thus, the main unit 2 of the present word processor system 20 incorporates the two display controllers 15 and 35.

As shown in FIG. 12, the main unit 2 has a connector 3e disposed on a side surface of the housing 2'. The cable 7 for connecting the large-sized display 6 to the main unit 2 has a jack 7a at its one end. The jack 7a of the cable 7 is coupled to the connector 3e of the main unit 2. The housing 2' incorporates a switch 30 disposed adjacent to the connector 3e. This switch 30 is normally open, and is closed when the jack 7a is plugged into the connector 3e. Thus, the switch 30 serves as detector means for sensing whether the cable 7 is connected to the main unit 2 or not. As described later in detail, the detector switch 30 serves also as power shut-off means.

Adjacent to the connector 3e, there is disposed a selector switch 31 which is operable between a DC position and an AC position. The main unit 2 further incorporates a battery 32, and an AC adapter 33 connectable to a suitable AC power source for converting the AC power into a DC power supply. With the selector switch 31 set in the DC position, the word processor system 20 is powered by the battery 32. In the AC position, the system 20 is operated with DC power from the AC adapter 33. A power on-off switch 34 is connected between the switch 30 and the selector switch 31.

The switch 30 is connected to the second display controller 35 to supply power to the same. By detecting a line voltage at the second display controller 35, the CPU 11 checks if the large-sized controller 35 is connected to the main unit 2.

When the large-sized display 6 is connected to the main unit 2 by plugging the jack 7a of the cable 7 into the connector 3e, the switch 30 is closed. By turning on the power on-off switch 34 in this condition, power is applied to the second display controller 35 via the switches 30, 34, and to the other components of the main unit 2 via the switch 34. In this condition, the liquid crystal display 5 and the large-sized display 6 are operable to display data entered through the keyboard 3.

As soon as the CPU 11 has detected that the second display controller 35 has been turned on, the CPU 11 commands the first display controller 15 so that the liquid crystal display 5 provides a message for three seconds in a flickering manner, prompting the operator to set the selector switch 31 in the AC position. Thus, the operator viewing this message is prompted to set the selector switch 31 as instructed. However, the word processor system 20 may be operated with the battery 32, for example, where no AC power source is available at the point of installation of the large-sized display 6. In this way, the word processor system 20 is made ready for operation.

When it is desired to carry the main unit 2 to another place, the cable 7 is disconnected from the connector 3e. As a result, the switch 30 is opened. In this condition, the main unit 2 can be powered by the battery 32, with the selector switch 31 set in the DC position and with the power on-off switch 34 turned on. However, the second display controller 35 is disconnected from the battery 32 by the shut-off switch 30 which is now held open. Therefore, the shut-off switch 30 prevents the second display controller 35 from wasting the battery energy. This arrangement is effective, particularly where the large-sized display 6 is a cathode ray tube for a television receiver, which requires a CRT controller of relatively high energy consumption as the second display controller 35.

While the present invention has been described in its preferred embodiments with a certain degree of particularity, it is to be understood that the invention is by no means confined to the precise details of the illustrated embodiments, but may be embodied with various changes, modifications and improvements which may occur to those skilled in the art, without departing from the spirit and scope of the invention defined in the appended claims.

What is claimed is:

1. A portable word processor, comprising:
   a main unit including input means for entering character data representative of characters, memory means for storing the character data entered through said input means, and a small-sized display having a first display capacity for displaying a first group of successive characters corresponding to the character data which are entered through said input means;
   a connector for disconnectably connecting said main unit to a large-sized display which has a second display capacity larger than said first display capacity of said small-sized display;
   said main unit further including large-display control means disconnectable connecting to said large-sized display through said connector, for controlling said large-sized display so as to display thereon a second group of successive characters corresponding to said character data stored in said memory means, and including the characters in said first group of characters, while said small-sized display is also displaying said first group of characters;
   power shut-off means for automatically disconnecting a power supply to said large-display control means when said large-sized display and said large-display control means of said main unit are not connected to each other through said connector; and
   said power-shut off means comprising a switch disposed adjacent to said connector, said switch being closed when said large-sized display and said main unit are connected to each other by said connector, and opened when said large-sized display and said main unit are disconnected, said switch being connected in a power supply line for supplying power to said large-display control means.

2. A portable word processor according to claim 1, comprising:
   first display control means for retrieving from said memory means a group of character data representative of said first group of successive characters equal in number to said first display capacity, and displaying said first group of successive characters on said small-sized display, based on the retrieved group of character data;
   second display control means for retrieving from said memory means a batch of character data representative of said second group of successive characters equal in number to said second display capacity and which includes said first group of successive characters, and displaying said second group of successive characters on said large-sized display, based on the retrieved batch of character data, said second display control means constituting said large-display control means; and indication control means for displaying an indicator on said large-sized display, said indicator indicating all of the characters which are currently displayed on said small-sized display, as distinguished from the other characters displayed on said large-sized display which are not displayed on said small-sized display.

3. A portable word processor according to claim 2, wherein said indication control means includes first cursor control means for controlling the position of a first cursor on said small-sized display, and second cursor control means for controlling the position of a second cursor on said large-sized display such that the positions of said first and second cursors respectively indicate the same character displayed on said small-sized display and on said large-sized display.

4. A portable word processor according to claim 1, further comprising:
 a DC power source;
 an AC adapter for converting an AC power supply into a DC power supply; and
 a selector switch for connecting selectively said DC power source or said AC adapter at least to said large-display control means.

5. A portable word processor according to claim 4, wherein at least one of said large-sized display and small-sized display provides a message prompting operator of the word portable processor to operate said selector switch so as to connect said AC adapter to said large-display control means when said large-sized display and said main unit are connected to each other.

6. A portable word processor according to claim 1, wherein said second display capacity of said large-sized display consists of a plurality lines having a predetermined length, and said first display capacity of said small-sized display consists of a single line of characters, the length of which is equal to or smaller than the predetermined length of said plurality of lines of said large-sized display.

* * * * *